United States Patent [19]
Andersson

[11] Patent Number: 5,943,616
[45] Date of Patent: Aug. 24, 1999

[54] SYSTEM AND METHOD FOR DATA EXCHANGE BETWEEN SUBSCRIBERS SUPPORTING INCOMPATIBLE STANDARDS

[75] Inventor: Dick Andersson, Kista, Sweden

[73] Assignee: Telefonaktiebolaget Lm Ericsson, Sweden

[21] Appl. No.: 08/748,754

[22] Filed: Nov. 14, 1996

[51] Int. Cl.[6] .............................. H04Q 7/22; H04Q 7/24
[52] U.S. Cl. ........................ 455/422; 455/433; 455/557
[58] Field of Search .................................. 455/422, 426, 455/433, 445, 557

[56] References Cited

U.S. PATENT DOCUMENTS

| | | | |
|---|---|---|---|
| 5,696,699 | 12/1997 | Nair ......................................... | 455/422 |
| 5,726,764 | 3/1998 | Averbuch et al. ....................... | 455/557 |
| 5,737,708 | 4/1998 | Grob et al. ............................... | 455/557 |
| 5,761,619 | 6/1998 | Danne et al. ............................ | 455/422 |
| 5,794,160 | 8/1998 | Ezuriko ..................................... | 455/557 |
| 5,796,728 | 8/1998 | Rondeau et al. ........................ | 455/557 |

OTHER PUBLICATIONS

Jayapalan, J., et al., "Cellular Data Services Architecture and Signaling", 1994 IEEE Personal Communications, ISN 1070–9916, vol. 1, No. 2, pp. 44–55.

Averbuch, R., "MIRS Radio to Radio PSTN Fax and Data Digital Call Implementation", Jun. 1994, Motorola Technical Developments, vol. 22, pp. 67–70.

Sugiyama K., et al. "Packet Routing Function on the PDC Mobile Packet Data Communication Network", 1996 IEEE International Conference on Communications (ICC), Converging Technologies for Tomorrow's Applications, Jun. 23–27, 1996, vol. 3 of 3, pp. 1382–1385.

*Primary Examiner*—Willis R. Wolfe
*Attorney, Agent, or Firm*—Jenkens & Gilchrist

[57] ABSTRACT

A telecommunications system and method for the exchange of standards information facilitates communication by invoking a standards translator whenever two users within the system utilize incompatible communication technologies. In accordance with an embodiment of the present invention, standards information is interchanged between two communications nodes, such that the equipment at those nodes may communicate with each other directly if the same standards are used at both nodes or communicate through the aid of the standards translator when different standards are used. The system and method of the present invention, through the interchange of standards information between the nodes, minimizes communications disruptions caused by mismatched standards.

35 Claims, 4 Drawing Sheets

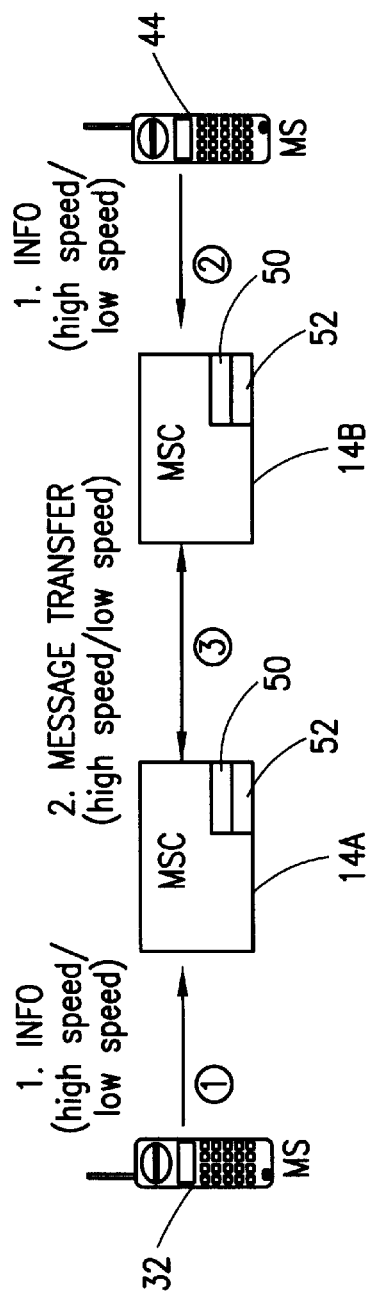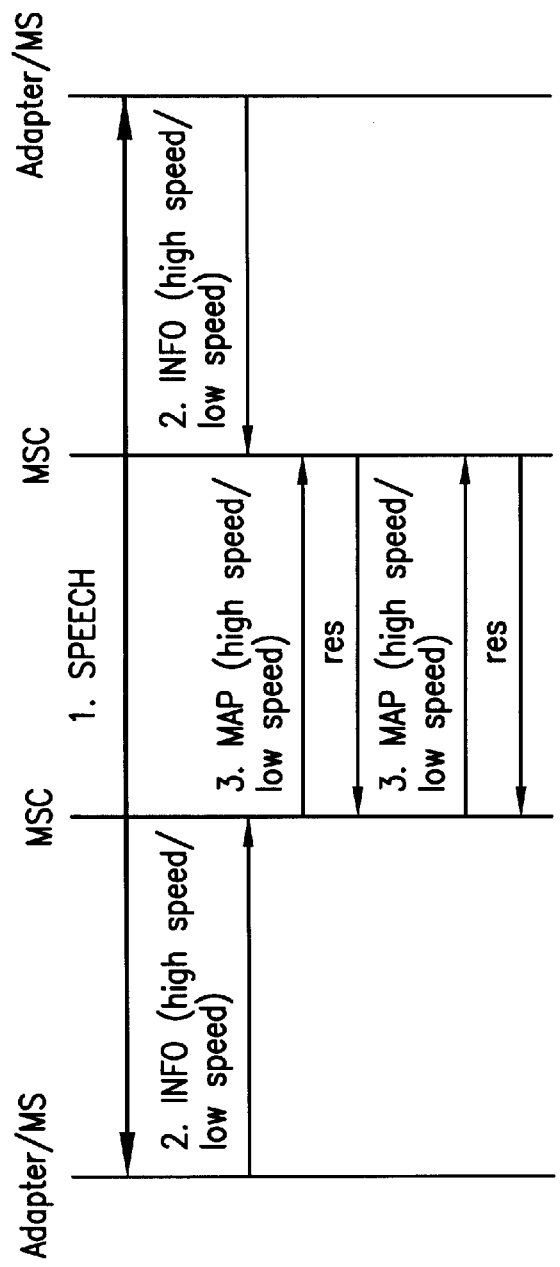

SYSTEM AND METHOD FOR DATA EXCHANGE BETWEEN SUBSCRIBERS SUPPORTING INCOMPATIBLE STANDARDS

BACKGROUND OF THE PRESENT INVENTION

1. Field of the Invention

The present invention relates generally to a telecommunications system and method for facilitating data exchanges between two users, particularly, to a telecommunication system and method for mediating data exchanges between user communication devices supporting different standards, and, more particularly, to a system and method for mediating data exchanges between two mobile subscribers operating under different and incompatible standards.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

This evolution in telephonic technology has also accelerated the growth of non-speech data communications, originally over the wireline, e.g., telecopy and facsimile, and now over the air. Furthermore, with the increasing use of computers, more and more individuals may, through their personal computer (PC) and a modem connection to an existing telephone network, communicate through the exchange of non-speech data. This phenomenon is best exemplified currently by the Internet. Although primarily confined to wireline systems today, the time for the transmission and exchange of non-speech data through mobile communications has arrived and is the subject of the present invention.

The interconnection of disparate systems, such as between a Public Land Mobile Network (PLMN) and a Public Switched Telephone Network (PSTN), i.e., a wireless and a wireline system, respectively, is common. As is understood by those skilled in this art, the interconnection and interoperation of such disparate systems, operating under very different standards and protocols, is difficult, and protocol translators are necessary to mediate communication.

One such protocol translator is a conventional interworking unit (IWU), which as its name suggests, mediates communication between different protocols within different systems. For example, through use of an IWU, a mobile subscriber in the PLMN may communicate with a user on the wireline PSTN, the IWU handling the protocol conversions necessary for the dialog.

In a Time Division Multiple Access (TDMA) digital standard now being used in Japan, named the Personal Digital Cellular (PDC) system, communication between mobile subscribers is performed using two operationally disparate speed levels, labeled low speed and high speed. Devices, such as modem adapters in, e.g., the PDC system, that are designed to operate at one speed, e.g., low, operate differently at the other and are technologically incompatible. Accordingly, two modem adapters at these different operational speeds cannot communicate and a protocol translator is required, such as the aforementioned IWU, to make the requisite protocol or standards conversions necessary for the mobiles' communication.

Although an IWU clearly may facilitate communication in a wireline or wireless environment, it is not always necessary to use one. For example, two mobile subscribers within a cellular system, such as PDC, both operating under the same standard, e.g., both low or both high speed, do not require the services of a translator and the subscribers may communicate directly. In particular, the modem or other adapters for each mobile subscriber in the communication understand each other. A translator such as the IWU is, however, necessary in a wireless system where the modem adapters used therein differ technologically, and failure to invoke the IWU in such instance results in communication failure and call disconnection.

Despite the aforedescribed standards mismatch problem, the IWU is generally not invoked during mobile-to-mobile calls within the PDC system, the system operating under the assumption that both subscribers utilize modems and other equipment with the same standard. Although this assumption may frequently be correct, when it is not and the standards of the modem adapters and other equipment of the two mobile subscribers are incompatible, communication is impossible without a protocol converter.

It is, accordingly, an object of the present invention to provide improved circuitry and methods to facilitate communication between equipment having different standards within a telecommunication system and avoid communication failures due to the aforedescribed incompatibilities.

It is also an object of the present invention to improve communications and avoid such failures through the exchange of standards information between the systems equipment, such as between the communications equipment of two mobile subscribers in a PDC system.

It is an additional object of the present invention to provide a method which invokes a protocol translator only when the protocols between subscribers' equipment mismatches.

SUMMARY OF THE INVENTION

A telecommunications system and method for the exchange of standards information facilitates communication by invoking a standards translator whenever two users within the system utilize incompatible communication technologies. In accordance with an embodiment of the present invention, standards information is interchanged between two communications nodes, such that the equipment at those nodes may communicate with each other directly if the same standards are used at both nodes or communicate through the aid of the standards translator when different standards are used. The system and method of the present invention, through the interchange of standards information between the nodes, minimizes communications disruptions caused by mismatched standards.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 4 is a block diagram of a portion of the PLMN of FIG. 1 illustrating the exchange of standards information in accordance with the present invention; and FIG. 5 is a detailed illustration of the steps for standards information exchange shown in FIG. 4.

DETAILED DESCRIPTION OF THE PRESENT INVENTION

The present invention will now be described more fully hereinafter with reference now to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
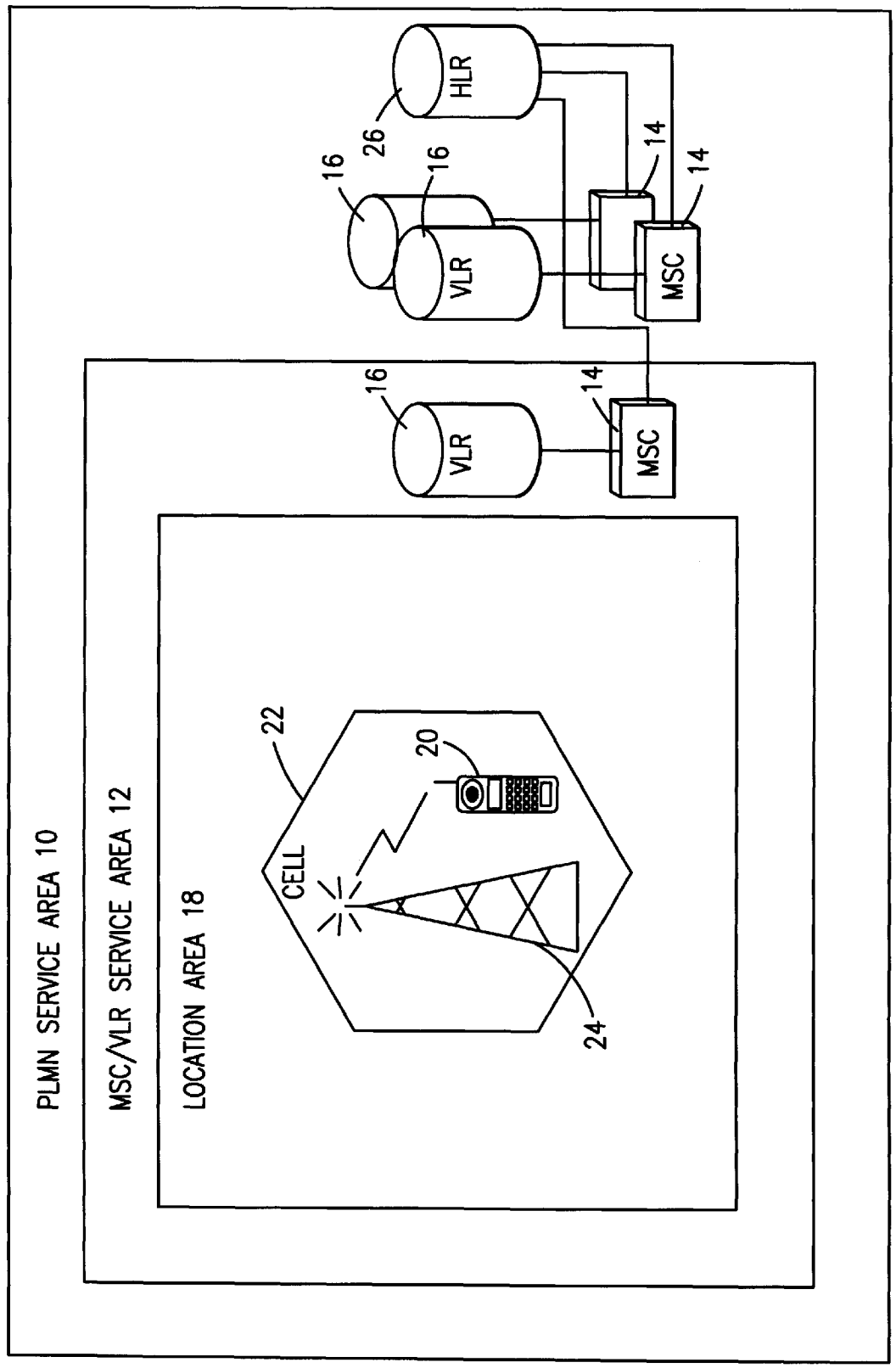
FIG. 1 is a block diagram of a PLMN or cellular telecommunications system according to an embodiment of the present invention.

With reference now to FIG. 1 of the drawings, there is illustrated a Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which is defined as that part of a given MSC/VLR area 12 in which a mobile station (MS) 20 may move freely without having to send update location information to the MSC/VLR area 12 that controls that LA 18. Each Location Area 18 is divided into a number of cells 22. Mobile Station 20 is the physical equipment, e.g., a car phone or other portable phone, used by mobile subscribers to communicate with the cellular network 10. A Base Station (BS) 24 is the physical equipment, such as the antenna shown in the figure, that provides radio coverage to the geographical area of the cell 22 in which to handle radio traffic to and from the MS 20.

With further reference to FIG. 1, the PLMN Service Area or cellular network 10 includes a Home Location Register 26, which is a central database within which a mobile subscriber is registered. The VLR 16 is a local database containing information about all of the mobile stations 20 currently located within the respective MSC/VLR Service Area 12. If a mobile station 20 roams into a new MSC/VLR area 12, the VLR 16 connected to the particular MSC 14 involved will request data about that mobile station 20 from the HLR database 26 (simultaneously informing the HLR 26 about the current location of the mobile station 20). Accordingly, if the user of the mobile station 20 then wants to make a call, the local VLR 16 will have the requisite identification information without having to reinterrogate the HLR 26. In the aforedescribed manner, the VLRs and HLR databases 16 and 26, respectively, contain various subscriber information associated with a given mobile station 20.

With the aforementioned increasing rise of wireless non-speech data transmissions, a mobile subscriber may, through a conventional connection with a personal computer (PC) and a modem adapter, transmit and receive a variety of non-speech data over the air within the PLMN 10. With the interconnection of the various telephony services, both wireline and wireless, e.g., PSTN and PLMN, the volume of wireless transference of non-speech data within a given PLMN, between PLMNs and between PLMNs and PSTNs will continue to increase.

Figure 2:
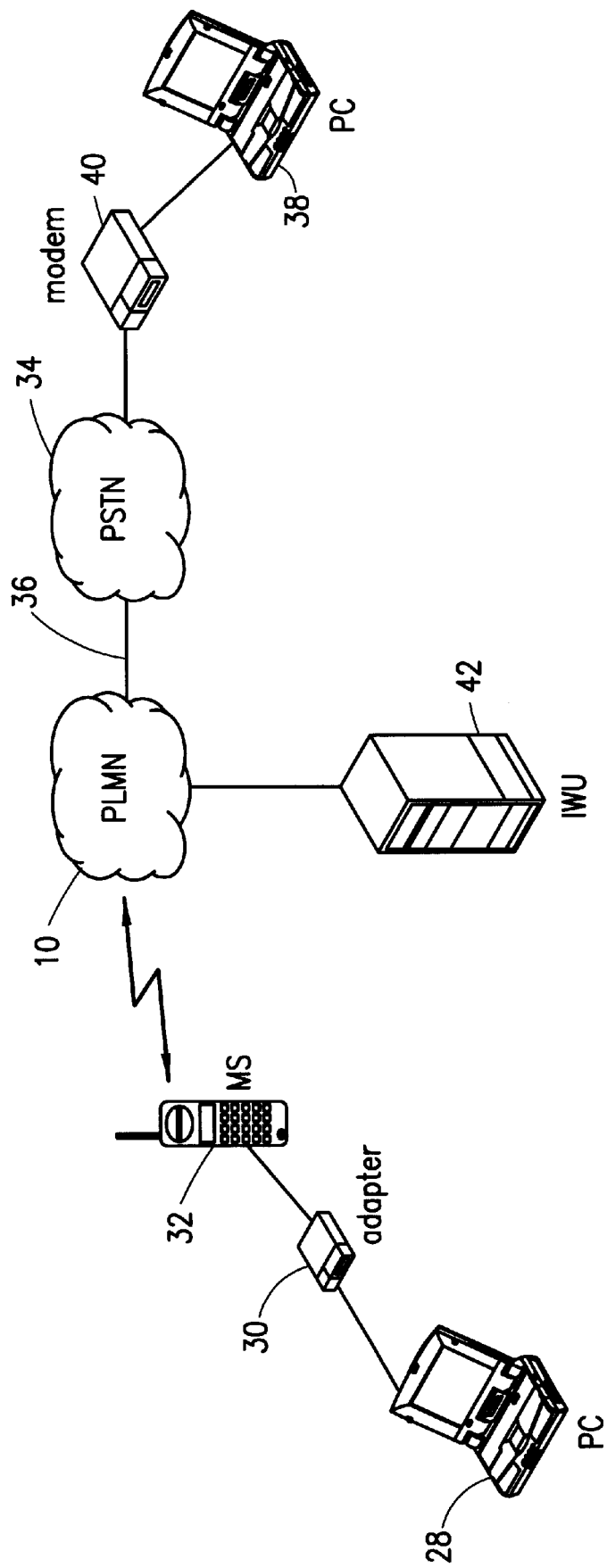
FIG. 2 is a block diagram illustrating a first embodiment of communications pathway between a mobile subscriber in the PLMN system of FIG. 1 to a subscriber in a PSTN system.

One such interconnected telephonic system is shown in FIG. 2, which illustrates a communication between a mobile subscriber in a PLMN system 10, as shown in FIG. 1, and a wireline or fixed subscriber, such as in a conventional PSTN telephone configuration. More particularly, FIG. 2 illustrates the communication between the subscribers' personal computers, in which a mobile subscriber's PC or laptop computer 28 is connected, via a conventional modem adapter 30, to their mobile station 32, such as a cellular or other radiotelephone. Transmissions of non-speech data from the mobile station 32 are mediated, as described in connection with FIG. 1, through the PLMN 10, i.e., emanating from the MS 32, received by and passing through the respective base station 24, forwarding on to the respective MSC 14 for that MSC/VLR area 12, and via the IWU 42 on to a PSTN 34 across a conventional wireline linkage 36. The wireline subscriber's PC or laptop computer 38 is, in turn, linked to the PSTN 34 via a conventional modem 40.

It should be understood that the modem adapter 30 and the modem 40 operate differently. The modem adapter 30, connected to mobile station 32, translates from/to the communications format or standard used within the PLMN 10 to/from the format of the PC 28. Similarly, the modem 40, connected to the conventional PSTN 34, converts data between the two standards, e.g., the digital representation from the PC to analog format in PSTN. It should additionally be understood that a modem, such as modem 40, may be connected between the PC 28 and modem adapter 30, shown in FIG. 2, to further facilitate conversion.

In the aforedescribed manner the mobile and wireline subscribers may exchange speech or non-speech data across the telephonic pathway therebetween. It is, of course, inevitable that various stumbling blocks lie in that pathway, interfering with or preventing said communication. One such stumbling block is the use of different and incompatible communications protocols or standards by the two subscribers.

With further reference to FIG. 2, there is shown an interworking unit (IWU) 42 which, as described, provides the requisite translation between two different standards or protocols so that the aforementioned two subscribers may communicate. Within the PDC system, for example, there are at the present time two such different and incompatible standards for data communication service, e.g., the aforementioned operationally distinct and technologically incompatible speed standards: low and high. Low speed, the first standard of the two, was developed in 1993 and supports communications at 2.4 kbps using a forward error correction (FEC) algorithm over the air interface. The later-developed high speed standard supports higher-rate communications and uses an automatic repeat request (ARQ) algorithm over the air interface. It should therefore, be understood that the two over-the-air standards differ primarily in protocol.

The respective modem adapter 30 and modem 40 in FIG. 2 convert or translate the information within the PCS 28 and 38, respectively, to/from one of these standards for transmission across the wireless and wireline pathway. Although communication between modem adapters supporting the same standard, i.e., low speed to low speed or high speed to high speed, is direct and mediated without the need of the protocol-translating IWU 42, when two different protocols, such as the aforementioned low and high speed configurations attempt to communicate directly, i.e., without the IWU 42, no communication is possible and the call is disconnected. It should be understood that in most instances the IWU 42 is required to perform the requisite protocol translation in the aforedescribed wireless/wireline cross-technology situation illustrated in FIG. 2.

Figure 3:
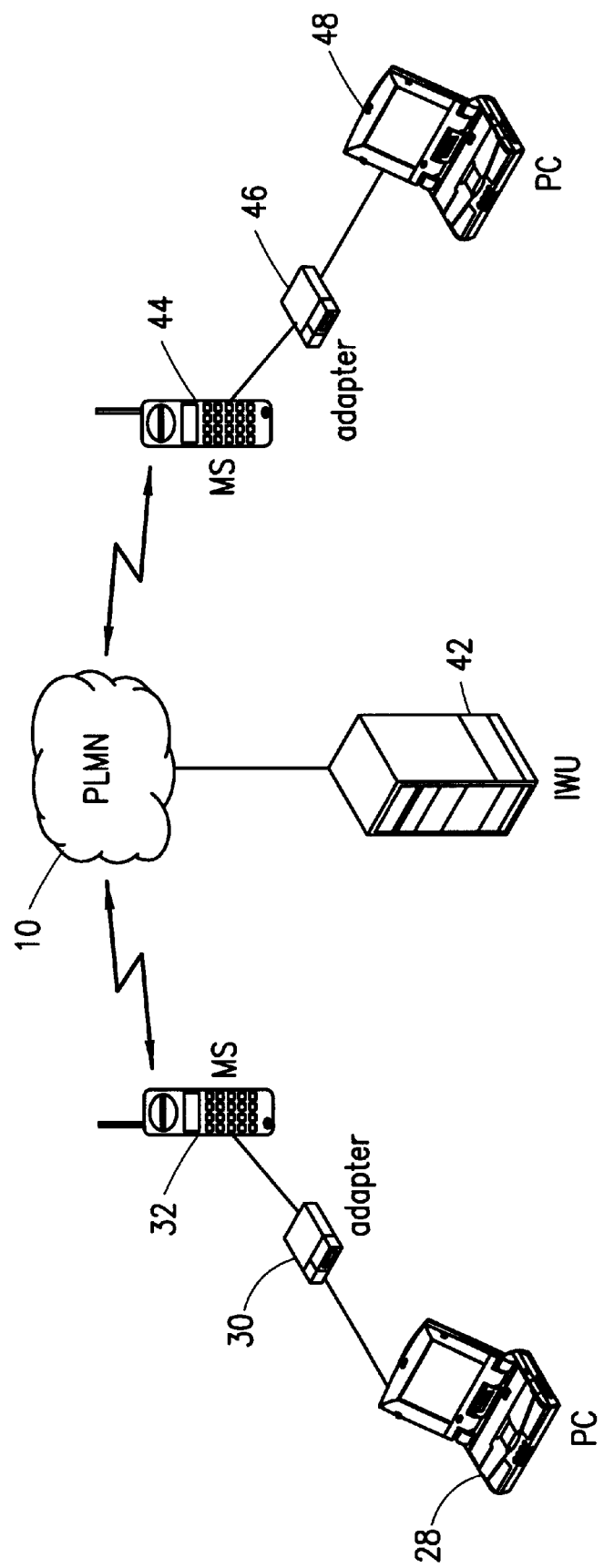
FIG. 3 is a block diagram illustrating a second embodiment of communications pathway between two mobile subscribers in the PLMN system of FIG. 1.

This problem of mismatched protocols, however, is not limited to the aforementioned instance of cross-technology communications. With reference now to FIG. 3 there are shown two mobile subscribers within a PLMN system 10, such as PDC. As illustrated, in addition to mobile station 32 there is a second mobile station 44 within the PDC system which is connected via a second modem adapter 46 to a second mobile subscriber's PC or laptop computer 48. It should be understood, therefore, that transmissions between the two mobile stations 32 and 44 are entirely within the PLMN 10, across the PLMN pathway described in connection with FIG. 1. As discussed, where the protocols match, i.e., the modem adapters 30 and 46 both operate at either low or high speeds, then no protocol translation is required and the IWU 42 is not invoked. If the protocols do not match, no communication is possible without the IWU 42, and its invocation is required.

It should be understood that the two mobile subscribers, through their respective mobile stations 32 and 44, may communicate through respective separate MSCs 14 in the PLMN 10, as shown and described in connection with FIG. 1, or through a mutually shared MSC 14. In either event, whenever the protocols between the subscribers, i.e., between their respective communication modem adapters 30 and 46 differ, invocation of the IWU 42 or other protocol standards translator is necessary.

Since the mobile switching centers 14 do not know the particular data communication standards used by the subscribers on other MSCs 14 within the PLMN 10 system, the general solution within the PDC and other systems is to automatically assume that the standards are the same and not invoke the IWU 42 to assist in such mobile-to-mobile calls. It should be understood that this general solution is also applicable in a mutually-shared MSC 14 scenario, where although the two subscribers share the same physical MSC 14, they are logically located on different nodes therein. As discussed, when the operational protocols or standards are the same, there is no communication problem and the subscribers may communicate without the need of the IWU 42. When the standards differ, however, the IWU 42 in conventional systems, such as the PDC system, is not initially invoked, communication fails and the call is disconnected.

The present invention is directed to a way to avoid this initial communication failure by the prior interchange of standards data between the MSCs 14 associated with the two subscribers. Alternatively, for subscribers sharing the same MSC 14, the MSC 14 in question refers to the standards data of the two subscribers stored therein. Preferably, this exchange occurs during the establishment of data communication between the pertinent MSCs 14, each MSC 14 forwarding information as to the particular kind of data service or standard its subscriber supports to the other MSC 14, e.g., a flag or data message indicating that either high or low speed data transfers are supported. The opposing MSC 14 then receives this information and compares this data to its own standards information. A first embodiment for this exchange is discussed hereinafter.

With reference now to FIG. 4 there is shown a portion of the PLMN 10 illustrated in FIG. 1. In a first embodiment of the present invention, two mobile subscribers communicate across a communications pathway formed by the respective mobile stations 32 and 44 and the MSCs 14A and 14B, respectively, associated therewith. In particular, the standard or format supported by the subscriber for mobile station 32 is stored within a standards data record 50 within MSC 14A, and the standard or format supported by the subscriber for mobile station 44 is stored within a corresponding standards data record 50 within MSC 14B. It should be understood that data record 50 may constitute a single bit, e.g., a "1" to indicate a high speed standard and a "0" for low speed, a multiple-bit record, or be a discrete part of a longer record.

MSCs 14A and 14B in the aforedescribed embodiment may additionally include another standards data record 52 representing the standard or format supported by the subscriber across the communication pathway. This record, too, may be one or many bits in length. In this manner, either MSC may examine the respective data records 50 and 52 stored therein to determine the compatibility of the communicating subscribers' standards. For example, if records 50 and 52 in MSC 14A match, then the services of a standards translator, e.g., IWU 42, is not needed and the two subscribers may communicate directly, i.e., their respective modems and/or modem adapters correspond technologically. Alternatively, where records 50 and 52 differ, the IWU 42 is needed. By use of the record information stored in the respective MSC 14 in accordance with the present invention, the determination of when the IWU 42 is required can be made quickly and accurately. A mechanism for exchanging the aforementioned standards information between two subscribers and their associated MSCs is discussed hereinafter.

With further reference to FIG. 4 there is shown a general representation of the aforementioned exchange between two mobile stations 32 and 44, each supporting a different and incompatible standard, e.g., mobile station 32 operates at high speed and mobile station 44 operates at low speed (or vice versa). After a channel has been established between two subscribers, one of the mobiles, e.g., mobile station 32, forwards a request to its pertinent and associated MSC, i.e., MSC 14A, in the PLMN 10 that data communications with the opposite mobile station 44 is desired (step 1 as indicated in the figure). Mobile station 44 then informs its pertinent and associated MSC, i.e., MSC 14B, of the desired data communication link (step 2 as indicated in the figure). During each contact between the mobile stations 32 and 44 and their associated MSCs 14A and 14B, respectively, the mobile stations each forwarded information as to the particular standard it supports, e.g., mobile station 32 informs the MSC 14A that high speed is supported therein, and mobile station 44 informs the MSC 14B that low speed is supported. As discussed, this standards information may be stored within the respective standards data records 50, shown in FIG. 4. The standards information is then exchanged between the two MSCs 14A and 14B in the PLMN 10 and the standards information of the opposing subscriber is stored within the respective MSC 14, e.g., within the aforedescribed opposing standards data records 52 (step 3 as indicated).

A more detailed description of the mechanism for implementing the standards exchange method of the present invention is illustrated in FIG. 5, in which International Telecommunication Union (ITU) Mobile Application Part (MAP) signaling is utilized. After the speech channel is established between the two MSCs 14A and 14B, as illustrated in FIG. 4 (step 1 as indicated in FIG. 5), the mobile stations request data communications to their respective MSCs 14, at which time the respective standards information supported by the subscriber, e.g., the transmission speed standard of the respective modem adapter 30 or 46, is then forwarded to the respective MSC 14 (step 2 as indicated) and stored in data record 50 therein. Through use of MAP signaling, each MSC is informed of the standard, e.g., the type of data service, the other subscriber in the call supports (step 3 as indicated). It should be understood that the order of the MAP signaling is irrelevant so long as the standards data is exchanged and stored in the appropriate opposite data record 52.

It should be understood that other signaling protocols, e.g., ISDN User Part (ISUP), may be used for the standards information exchange.

By use of the aforedescribed method both MSCs 14A and 14B shown in FIGS. 4 and 5 are able to prevent the aforementioned problems of communications failure due to standards incompatibilities. Thus, an MSC, e.g., MSC 14A, can compare the standards of the subscribers in a particular communication by referring to the information previously exchanged and stored in records 50 and 52, and properly invoke the IWU 42 when those standards conflict or allow the communication to proceed without such invocation when the standards coincide. In this manner the MSCs (or MSC if shared) can always make the correct decision whether or not to invoke the IWU 42 or other protocol translator in the data calls. In other words, the network, such as a PDC network, can offer circuit switched mobile-to-mobile data calls independent of the particular type of service the mobile subscribers support.

It should be understood that instead of storing the standards information of the subscriber at the other end of the communication pathway, a compatibility flag or record may be stored. For example, the respective MSC 14 may receive the standards information of the two subscribers in the aforedescribed manner, compare them and instead store the compatibility flag, where a "1" indicates compatibility and a "0" indicates none.

It should finally be understood that although the present invention has been illustrated and described in connection with a PDC system, the subject matter of the invention may be practical in other cellular systems as well.

The previous description is of preferred embodiments for implementing the invention, and the scope of the invention should not necessarily be limited by this description. The scope of the present invention is instead defined by the following claims.

What is claimed is:

1. A cellular communication system for mediating data exchange between two communications standards, said system comprising:

a first and a second mobile switching center having a communication link therebetween, a first and a second mobile subscriber being associated with and in communication with said first and second mobile switching centers, respectively, a communication pathway being formed between said first and second mobile subscribers through the respective mobile switching centers across said link, said first and second mobile subscribers each communicating across said pathway through a first and a second communications standard, respectively;

a first and a second compatibility record, within said first and second mobile switching centers, respectively, for indicating a standards compatibility between said first and second mobile subscribers, said standards compatibility being set upon establishment of said communication pathway; and data exchange means, attached to said communication link, for mediating data exchange between said first and second subscribers when said standards compatiblity indicates that said first and second communications standards are compatible, and for mediating said data exchange through a standards translator when said first and second communications standards differ.

2. The cellular communication system according to claim 1, wherein said first and said second subscribers communicate with the respective mobile switching center through a first and a second mobile station, respectively.

3. The cellular communication system according to claim 2, further comprising:

a first and a second personal computer attached to said first and said second mobile station, respectively.

4. The cellular communication system according to claim 3, further comprising:

a first and a second modem adapter, attached to said first and said second mobile station, respectively, and to said first and said second personal computer, respectively, for moderating said data exchange over the pathway, each said first and second modem adapters operating in accordance with said first and second communications standard, respectively.

5. The cellular communications system according to claim 4, further comprising:

a modem, attached between a respective one of said modem adapters and the respective personal computer, for moderating said data exchange over the pathway.

6. The cellular communications system according to claim 1, wherein said translation means is an interworking unit.

7. The cellular communications system according to claim 1, wherein said first and said second mobile subscribers are in communication with the same mobile switching center.

8. The cellular communications system according to claim 1, wherein said cellular communications system is a Public Land Mobile Network.

9. The cellular communications system according to claim 8, wherein said Pubic Land Mobile Network is a Personal Digital Cellular system.

10. The cellular communications system according to claim 1, wherein said compatibility record constitutes a one-bit flag.

11. The cellular communications system according to claim 1, wherein said compatibility record comprises:

a standards record, within each of said first and second mobile switching centers, for indicating the communications standard for the respective associated subscriber; and an opposite standards record, within each of said first and second mobile switching centers, for indicating the communications standard for the respective subscriber on the opposing end of said pathway, wherein said translation means is invoked when said standards record and said opposite standards record within a given mobile switching center differ.

12. The cellular communication system according to claim 11, wherein said standards and opposite standards records each comprise a one-bit flag.

13. The cellular communication system according to claim 1, wherein said data exchanged across said pathway is non-speech data.

14. A communication system for mediating data exchange between two communications standards, said system comprising:

a first mobile switching center having a mobile subscriber in communication therewith;

a second mobile switching center having a user within a wireline system in communication therewith, said first and second mobile switching centers having a communications link therebetween, a communication pathway being formed between said mobile subscriber and said user through said wireline system and said first and second mobile switching centers across said link, said mobile subscriber and said user each communicating across said pathway through a first and a second communications standard, respectively;

a first and a second compatibility record, within said first and second mobile switching centers, respectively, for indicating a standards compatibility between said mobile subscriber and said user, said standards compatibility being set upon establishment of said communication pathway; and data exchange means, attached to said communication link, for mediating data exchange between said mobile subscriber and said user when said standards compatiblity indicates that said first and second communications standards are compatible, and for mediating said data exchange through a standards translator when said first and second communications standards differ.

15. The cellular communications system according to claim 14, further comprising:

a first personal computer attached to a mobile station of said given mobile subscriber; and a second personal computer attached to said second mobile switching center.

16. The cellular communications system according to claim 15, further comprising:

a modem adapter, attached to and between said first personal computer and said mobile station of said given mobile subscriber, and operating in accordance with said first communications standard; and a modem, attached to and between said second personal computer and said second mobile switching center, and operating in accordance with said second communications standard.

17. The cellular communications system according to claim 16, further comprising:

a modem, attached between said modem adapter and said first personal computer, for moderating said data exchange over the pathway.

18. The cellular communications system according to claim 14, wherein said translation means is an interworking unit.

19. The cellular communications system according to claim 14, wherein said given mobile subscriber and said user are in communication with the same mobile switching center.

20. The cellular communications system according to claim 14, wherein said cellular component is a Public Land Mobile Network.

21. The cellular communications system according to claim 20, wherein said Public Land Mobile Network is a Personal Digital Cellular system.

22. The cellular communications system according to claim 14, wherein said compatibility record constitutes a one-bit flag.

23. The cellular communications system according to claim 14, wherein said compatibility record comprises:

a standards record, within each of said first and second mobile switching centers, for indicating the communications standard for the respective given mobile subscriber and user; and an opposite standards record, within each of said first and second mobile switching centers, for indicating the communications standard for the given mobile subscriber and user, respectively, at the opposing end of said pathway, wherein said translation means is invoked when said standards record and said opposite standards record within a given mobile switching center differ.

24. The cellular communications system according to claim 23, wherein said standards and opposite standards records each comprise a one-bit flag.

25. The cellular communications system according to claim 14, wherein said data exchanged across said pathway is non-speech data.

26. A method for mediating data exchange between two communications standards through a cellular communication system, said system having a multiplicity of mobile switching centers and a multiplicity of mobile subscribers therein, a first and a second of said mobile subscribers being associated with and in communication with a first and a second of said mobile switching centers, respectively, said first and second mobile switching center having a communications link therebetween, a communications pathway being formed between said first and second mobile subscribers through the respective mobile switching centers across said link, said first and said second mobile subscribers each communicating across said pathway through a first and a second communications standard, respectively, said data exchange method comprising the steps of:

transferring, during communications establishment, values for the first and second communications standards from said first and second mobile subscribers, respectively, to the first and second mobile switching centers, respectively;

transferring, after communications establishment, the values for said first and second communications standards between said first and second mobile switching centers; and determining, within a respective mobile switching center, a compatibility value representing the compatibility between the first and second communications standards, said data exchange proceeding when said compatibility value indicates that said first and second communication values are compatible, said data exchange being mediated through a standards translator when said communications standards differ.

27. The method according to claim 26, wherein said step of transferring said communications standards values from said first and second mobile subscribers to said first and second mobile switching centers, respectively, further comprises:

storing, for said first and second mobile subscribers, the respective communications standard value in a standards record within the mobile switching center associated with the respective mobile subscriber.

28. The method according to claim 27, wherein said step of transferring said communications standards values between said mobile switching centers further comprises:

storing, for said first and second mobile subscribers, the respective communications standards value used by the subscriber at the opposite end of the pathway in an opposite standards record within the mobile switching center associated with the respective mobile subscriber, comparing said standards record and said opposite standards record within said respective mobile switching center, said data exchange proceeding when said standards record and said opposite standards record match, and said step of determining further comprising translating through a standards translator when said standards record and said opposite standards record differ.

29. The method according to claim 26, wherein said step of transferring said communications standards values between said mobile switching centers comprises Mobile Application Part signaling.

30. The method according to claim 26, wherein said step of transferring said communications standards values between said mobile switching centers comprises ISDN User Port signaling.

31. A method for moderating data exchange between two communications standards through a cellular communications system, said system having a multiplicity of mobile switching centers and a multiplicity of mobile subscribers therein, said system being in communication with at least one other communications system, a given mobile subscriber within said cellular communications system in communication with a first of said mobile switching centers and a user within said at least one other communications system in communication with a second of said mobile switching centers, said first and second mobile switching centers having a communications link therebetween, a communications pathway being formed between said given mobile subscriber and said user through the other communications system and said mobile switching centers across said link, said given mobile subscriber and said user each communicating across said pathway through a first and a second communications standard, respectively, said data exchange method comprising the steps of:

transferring, during communications establishment, values for the first and second communications standards from said given mobile subscriber and user, respectively, to the first and second mobile switching centers, respectively;

transferring, after communications establishment, the values for said first and second communications standards between said first and second mobile switching centers; and determining within a respective mobile switching center, a compatibility value representing the compatibility between the first and second communications standards, said data exchange proceeding when said compatibility value indicates that said first and second communications standards are compatible, and said data exchange being mediated through a standards translator when said communications standards differ.

32. The method according to claim 31, wherein said step of transferring said communications standards values from said given mobile subscriber and said user to said first and second mobile switching centers, respectively, further comprises:

storing, for said given mobile subscriber and user, respectively, the respective communications standards value in a standards record within the mobile switching center associated with said given mobile subscriber and said user, respectively.

33. The method according to claim 32, wherein said step of transferring said communications standards values between said mobile switching centers further comprises:

storing the respective value of the communications standard used at the opposite end of said pathway in an opposite standards record within the respective mobile switching center, said step of determining comprising comparing said standards record and said opposite standards record within said respective mobile switching center, said data exchange proceeding when said standards record and said opposite standards record match, and said step of determining further comprising translating through a standards translator when said standards record and said opposite standards record differ.

34. The method according to claim 31, wherein said step of transferring said communications standards values between said mobile switching centers comprises Mobile Application Part signaling.

35. The method according to claim 31, wherein said step of transferring said communications standards values between said mobile switching centers comprises ISDN User Port signaling.

\* \* \* \* \*